(54) SYSTEM AND METHOD FOR MULTI-DIMENSIONAL MOTION INTERPOLATION USING VERBS AND ADVERBS

(75) Inventors: Charles F. Rose, Redmond; Michael F. Cohen, Seattle, both of WA (US); Robert E. Bodenheimer, Jr., Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/368,750

(22) Filed: Aug. 5, 1999

(51) Int. Cl.⁷ ............................................. G06T 13/00
(52) U.S. Cl. ...................................................... 345/473
(58) Field of Search ................................ 345/473, 475, 345/418, 706, 728, 952; 434/236

(56) References Cited

U.S. PATENT DOCUMENTS 5,877,778 A  3/1999  Dow et al. .................. 345/474

OTHER PUBLICATIONS

Powell, M.J.D., "Radial Basis Functions For Multivariable Interpolation: A Review," Algorithms for Approximation, Oxford University Press, Oxford, UK, 1987, pp. 143–167.

Ruprecht, D., et al., "Image Warping With Scattered Data Interpolation," IEEE Computer Graphics and Applications, 15, Mar. 2, 1995, pp. 37–43.

Arad, N., et al., "Image Warping By Radial Basis Functions: Application To Facial Expressions," Computer Vision, Graphics, and Image Processing: Graphical Models and Image Processing, 56, Mar. 2, 1994, pp. 161–172.

Rose, C., et al., "Efficient Generation Of Motion Transitions Using Spacetime Constraints," Computer Graphics (Proc. Siggraph 96), Aug. 1996, pp. 147–154.

Girard, M., et al., "Computational Modeling For The Computer Animation Of Legged Figures," Computer Graphics (Proc. Siggraph 85), ACM Press, New York, Jul. 1985, pp. 263–270.

Watt, A., et al. "Advanced Animation And Rendering Techniques: Theory And Practice," ACM Press, New York, 1992, pp. 369–394.

Unuma, M., et al., "Fourier Principles for Emotion–based Human Figure Animation," Computer Graphics (Proc. Siggraph 95), ACM Press, New York, Aug. 1995, pp. 91–96.

Amaya, K., et al., "Emotion From Motion," Graphics Interface 96, San Francisco, May 1996, pp. 222–229.

Bruderlin, A., et al., "Motion Signal Processing," Computer Graphics (Proc. Siggraph 95), ACM Press, New York, Aug. 1995, pp. 97–104.

(List continued on next page.)

Primary Examiner—Mark Zimmerman
Assistant Examiner—Lance W. Sealey
(74) Attorney, Agent, or Firm—Woodcock Washburn LLP

(57) ABSTRACT

A system for providing improved computer animation can be used in interactive applications such as 3D video games and virtual environments. Tie system comprises an offline authoring system with tools for constructing controllable "verbs" from sets of motion example segments, and for constructing transitions between different verbs; and a runtime system for controlling the invocation of the verbs as parameterized by user defined "adverbs". The system involves interpolating predefined animation segments created by an animator or through motion capture video. The animation segments are made up of data representing selected points on the animated creature (e.g., the joints and extremities) and values, as a function of time, for each degree of freedom of those points. In addition, a "verb graph" is constructed to act as the glue to assemble verbs and their adverbs into a runtime data structure. The verb graph defines the allowable transitions from one verb to another verb. A set of "keytimes" is also defined. The keytimes are instances when important structural events occur, and are used to pre-process the motion examples into a synchronized (canonical) time frame for interpolation.

38 Claims, 9 Drawing Sheets

OTHER PUBLICATIONS

Witkin, A., et al., "Motion Warping," Computer Graphics (Proc. Siggraph 95), ACM Press, New York, Aug. 1995, pp. 105–108.

Perlin, K, "Real Time Responsive Animation with Personality," IEEE Trans on Visualization and Computer Graphics, 1, Mar. 1, 1995, pp. 5–15.

Wiley, D.J., et al., "Interpolation Synthesis for Articulated Figure Motion," Proc. Virtual Reality Annual Int'l Symp., IEEE CS Press, Mar. 1997, pp. 156–160.

Guo, S., et al., "A High–Level Control Mechanism For Human Locomotion Based On Parametric Frame Space Interpolation," Proc. Computer Animation and Simulation 96, Eurographics Animation Workshop, New York, Aug. 1996, pp. 95–107.

Hodgins, J.K., et al., "Adapting Simulated Behaviors For New Characters," Computer Graphics (Proc. Siggraph 97), ACM Press, New York, Aug. 1997, pp. 153–162.

Bartels, R.H., et al., "An Introduction To Splines For Use In Computer Graphics And Geometric Modeling," Morgan Kaufmann, San Francisco, 1987, pp. 1–67.

Bodenheimer, B., et al., "The Process Of Motion Capture: Dealing With The Data," Computer Animation And Simulation 97, Eurographics Animation Workshop, springer, New York, Sep. 1997, pp. 3–18.

Micchelli, C.A., "Interpolation Of Scattered Data: Distance Matrices And Conditionally Positive Definite Functions," Constructive Approximation 2, 1986, pp. 11–22.

SYSTEM AND METHOD FOR MULTI-DIMENSIONAL MOTION INTERPOLATION USING VERBS AND ADVERBS

FIELD OF THE INVENTION

The present invention relates in general to the fields of computer graphics and computer animation, and more particularly to methods and systems for authoring and rendering animated creatures, e.g., in the context of interactive applications such as 3D video games and virtual environments. Although the detailed description of the invention set forth herein refers to the creation of animated human figures, the invention is by no means limited thereto.

BACKGROUND OF THE INVENTION

Creating believable animated human figures proves difficult, even with the most sophisticated software available. Once an acceptable animation segment has been created, either by an animator or through motion-capture, the results remain difficult to reuse. The additional work needed to modify the animation may take almost as much time as the time required to create the original motion. Furthermore, the exact style or structure needed for a particular motion may not be known until runtime. Interactive applications, such as a 3D video game or a virtual environment require an animation system that permits the animated figures to be controlled by a user in real time.

Research into controllable human figure animation divides into three major groupings: procedural, simulated, and interpolated. Procedural animation uses code fragments to derive the degrees of freedom (DOF) values at a particular time. The procedures can be as sophisticated as needed to provide different motion styles or react to different conditions of the simulated environment.

Dynamically simulated figure animation uses controllers together with a simulated human to generate motion. The degree to which this method succeeds relies on how accurately the human motion is understood and modeled. Unfortunately, both procedural and dynamic methods can alienate classically trained animators and use motion-capture technology ineffectively. This proves important since animators and motion-capture systems each produce compelling results. To leverage their qualities, a system should use what these resources provide.

The third major grouping, interpolated animation, uses sets of motion examples with an interpolation scheme to construct new motions. The primary problems to solve with this approach are to provide a set of meaningful, high-level control knobs to the animator or runtime system, to maintain the aesthetic of the source motions in the interpolated motions, and to extrapolate motion. Additionally, motion interpolation must be efficient for use in a runtime environment.

The idea of altering existing animation to produce different characteristics is not new. Unuma et al., Fourier Principles For Emotion-Based Human Figure Animation, Computer Graphics (Proc. Siggraph 95), ACM Press, New York, August 1995, pp. 91–96, use Fourier techniques to interpolate and extrapolate motion data. Amaya et al., Emotion From Motion, Graphics Interface 96, San Francisco, May 1996, pp. 222–229, alter existing animation by extracting an "emotional transform" from motion examples, which they then apply to other motions. For example, "anger" from an angry walk can be applied to a run to generate an "angry" run.

Bruderlin and Williams, Motion Signal Processing, Computer Graphics (Proc. Siggraph 95), ACM Press, New York, August 1995, pp. 97–104, use multi-target interpolation with dynamic time warping to blend between motions and displacement mappings to alter motions such as grasps. Witkin and Popovic, Motion Warping, Computer Graphics (Proc. Siggraph 95), ACM Press, New York, August 1995, pp. 105–108, have a similar system for editing motion-capture clips. Perlin, Real-Time Responsive Animation With Personality, IEEE Trans on Visualization and Computer Graphics, 1, 1, March 1995, pp. 5–15, approaches this problem in a very different way by using noise functions to simulate personality and emotion in existing animation.

Both Wiley and Hahn, Interpolation Synthesis For Articulated Figure Motion, Proc. Virtual Reality Annual Int'l Symp., IEEE CS Press, March 1997, pp. 157–160, and Guo and Roberge, "A High-Level Control Mechanism For Human Locomotion Based On Parametric Frame Space Interpolation, Proc. Computer Animation and Simulation 96, Eurographics Animation Workshop, New York, August 1996, pp. 95–107, produce new motions using linear interpolation on a set of motion examples. Both techniques require $O(2^d)$ examples, where d is the dimensionality of the control space and O represents the Order function. In general, techniques which require $O(2^d)$ examples or which run in $O(2^d)$ time are not practical. This is well known in the field of computer science.

Wiley and Hahn's time scaling is uniform. While uniform time scaling obviates the need for an animator to select structurally similar poses during motions, it assumes that the motions being interpolated are very similar in time. When this assumption is violated, oddities in the motion can result. Wiley and Hahn also reparameterize and sample their motions on a multi-dimensional grid. Simple interpolations are then performed at runtime. This requires computation and storage exponential in the number of parameters, i.e., $O(2^d)$.

Additionally, neither Wiley and Hahn nor Guo and Roberge discuss blending subsets of examples, which would arise when a designer places new examples "between" old examples when refining the interpolated motion space.

Hodgins and Pollard, Adapting Simulated Behaviors For New Characters, Computer Graphics (Proc. Siggraph 97), ACM Press, New York, August 1997, pp. 153–162, interpolate over the space of control laws as opposed to joint trajectories. The control functions define the gains in the joints within a physical dynamics framework. By interpolating the control for an action such as running, they can alter a figure's physical characteristics from a child to an adult or from a male to a female character.

Accordingly, there is a need for improved animation authoring and rendering systems for providing animated objects that a user can manipulate in real time.

SUMMARY OF THE INVENTION

The present invention is directed to systems and methods that address the problem of providing improved (faster for a given amount of computer resources) computer animation, and can be used in interactive applications such as 3D video games and virtual environments.

Systems and methods are described for interpolating predefined animation segments, or motion examples, which may be created by an animator or through motion capture video. The invention performs multi-dimensional interpolation between multiple examples, and works in the time domain, thus providing interpolation of non-periodic as well as periodic examples. Radial basis functions (e.g., cubic B-spline functions) are preferably used for the multi-dimensional interpolation because they are efficient enough for use in a runtime environment in which high level control knobs are employed to control the animation.

According to the invention, "verbs" are defined as motions parameterized by "adverbs". The adverbs relate, e.g., to the mood, goal or physical characteristics attributable to the motion. For example, the verb "walk" may be defined for an animation segment depicting the walking motion of a creature or animated object (e.g., a model of a person). The adverbs "happy/sad", "knowledgeable/clueless", "left/right" and "up hill/down hill" may be defined to parameterize different example segments of the "walk" verb. In other words, one could create animation segments of a person walking on a level plane, walking up hill, and walking down hill, for example. One could further create segments of a "happy" person walking and a "sad" person walking, and a "knowledgeable" person walking and a "clueless" person walking. The animation segments would be made up of data representing selected points on the animated object (e.g., the joints and extremities) and values, as a function of time, for each degree of freedom of those points.

Thus, by creating parameterized motions, i.e., "verbs" parameterized by "adverbs", a single authored verb produces a continuous range of subtle variations of a given motion at real-time rates. As a result, simulated figures alter their actions based on their momentary mood or in response to changes in their goals or environmental stimuli. For example, a "walk" verb is demonstrated that can show emotions such as happiness and sadness, together with subtle variations due to walking up or down hill while turning to the left and right.

A "verb graph" is constructed to act as the glue to assemble verbs and their adverbs into a runtime data structure. The verb graph provides the means for seamless transition from verb to verb within an interactive runtime system. In other words, the verb graph defines the allowable transitions from one verb (such as walking) to another verb (such as sitting). Additionally, the verb graph structures the overall flow of an animation, ensuring that actions logically follow one another as envisioned by the designer.

The invention may be implemented in a two-part system comprising (1) an offline authoring system with tools for constructing controllable verbs from sets of motion example segments, and for constructing transitions between different verbs; and (2) a runtime system for controlling the invocation of the verbs as parameterized by user defined adverbs. Additionally, a set of "keytimes" may be defined. Keytimes are instances when important structural events, such as a foot down, occur. According to a preferred implementation of the invention, these keytimes are used to pre-process the motion examples into a synchronized (canonical or normalized) time frame for interpolation. The keytimes ensure that the motion examples have the same overall duration and the same duration between physically significant events (such as foot down), so that the interpolation between two example points makes physical sense.

The foregoing and other aspects of the present invention will become apparent from the following detailed description of the invention when considered in conjunction with the accompanying drawings.

DETAILED DESCRIPTION OF THE ILLUSTRATED EMBODIMENTS

Overview

The animation system and method of the present invention comprises an offline authoring system and method and a runtime system and method. The offline authoring system provides the tools for a designer to construct controllable motions, also known as verbs, from sets of examples. In addition, the authoring system provides tools for constructing transitions between verbs. The authoring system also puts the verbs and transitions together in a verb graph. The verb graph is the object that is controlled for the runtime portion of the verbs and adverbs system. The runtime system controls the invocation of verbs and evaluation of the figure's pose at each frame of the animation.

The simulated figures discussed herein, also called "objects" or "creatures," are represented as a hierarchy of rigid links connected by joints. Each joint may contain one or more rotational degrees of freedom (DOFs). The root of the hierarchy has six special DOFs representing the figure's position and orientation in the global coordinate frame. The root is located between the hips, for global positioning and orientation. In the example described below, the final model has 40 joint DOF in addition to six DOFs of the root. Thus, a 46 DOF human figure is used in the exemplary embodiments described herein, although any number of DOFs can be used. Each degree of freedom's motion is represented as a function through time $\theta_j(T)$, j=1 . . . NumDOFs, where T represents clock time from [0 . . . duration of the motion], which is defined as keytime time, as described below. Given these motions of the DOFs, the creature can be rendered at any point in time.

The present invention will now be explained with reference to a presently preferred embodiment thereof. First, we provide a description of an exemplary computer environment, and then we provide a detailed description of the inventive system and method for multi-dimensional motion interpolation.

Exemplary Operating Environment

Figure 1:
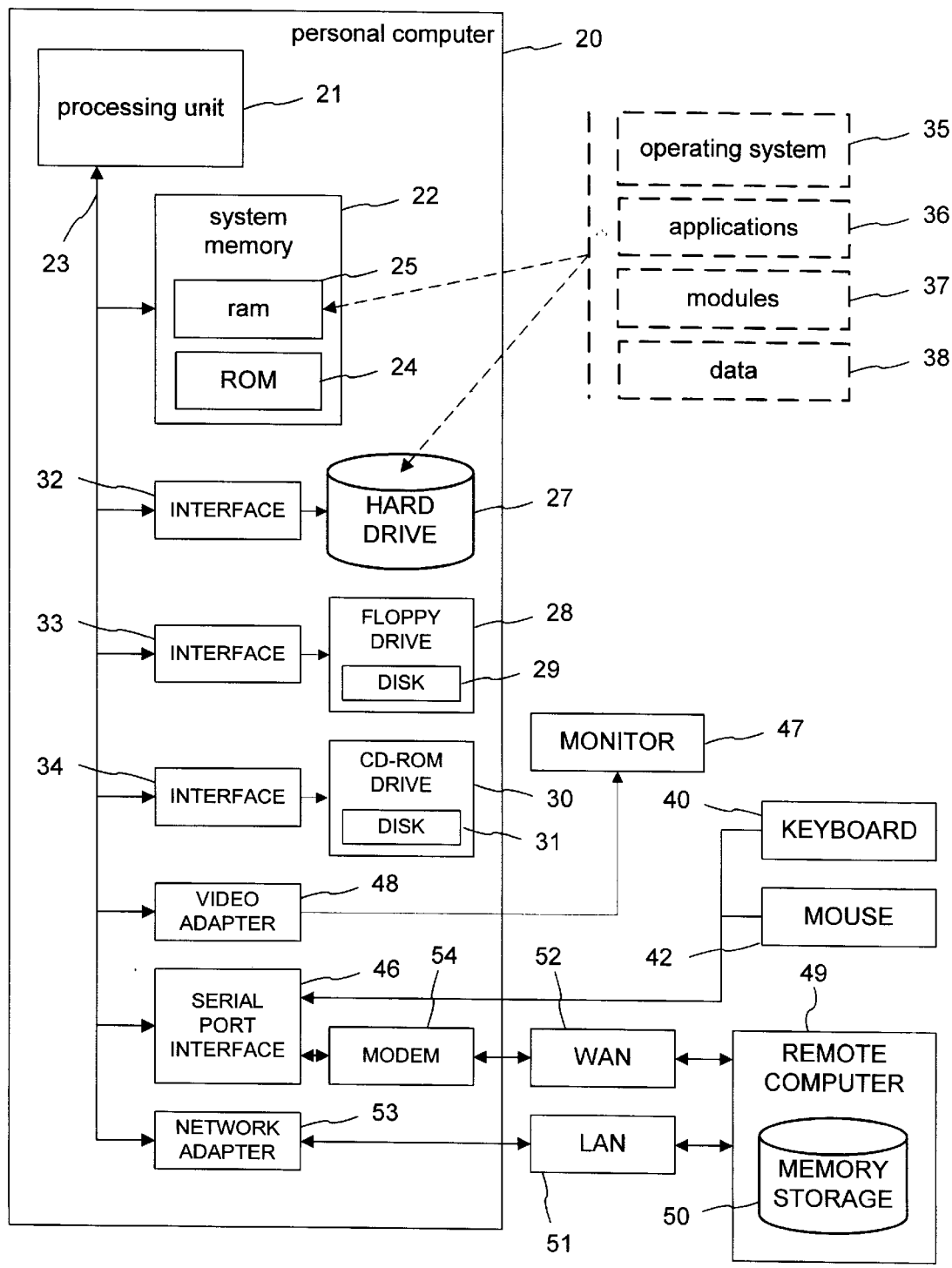
FIG. 1 is a block diagram of a computer system that can be used to implement a method and apparatus embodying the invention for constructing motions, and transitions between these motions, for a computer animated figure.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics such as video game consoles, minicomputers, mainframe computers, and the like. The illustrated embodiment of the invention also is practiced in distributed computing environments where tasks are performed by remote processing devices that are linked through a communications network. But, some embodiments of the invention can be practiced on standalone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Offline Authoring System and Method

An offline authoring system and method in accordance with the present invention is used to construct verbs, construct transitions between verbs, and construct a verb graph. A verb is defined by a set of motion examples. Each motion example has a set of adverb values. A set of keytimes and intermittent constraints also act on each motion example.

As described above, a verb is a controllable motion. In accordance with the present invention, the DOF functions for a verb are not explicitly represented, but rather evolve at runtime through interpolating motion examples weighted by changing interpolation parameters or adverbs. These adverbs may represent emotional axes such as happy-sad, knowledgeable-clueless, and so on. They may also represent physical parameters such as whether, in the case of a walk verb, the figure walks up or down hill and whether the motion curves to the left or right. The set of adverb axes define a multi-dimensional adverb space of possible variations for a particular verb.

Figure 2:
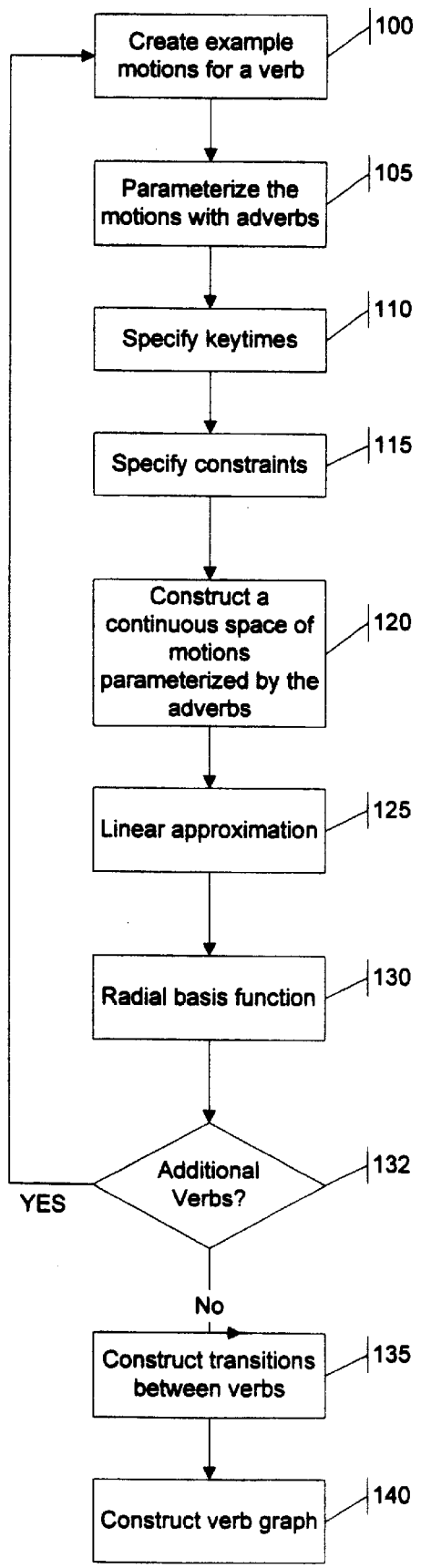
FIG. 2 is a flow diagram of an exemplary offline authoring method in accordance with the present invention.

An exemplary method of creating verbs and a verb graph in accordance with the present invention is shown in FIG. 2, and is described in further detail below. At step 100, motion examples are created for a verb. The motion examples are parameterized with adverbs at step 105. Keytimes are specified at step 110, and constraints are included at step 115. A continuous space of motions parameterized by the adverbs is constructed at step 120, using linear approximation at step 125 and radial basis functions at step 130. If additional verbs are to be constructed, as determined at step 132, steps 100–130 are repeated for each verb. After the desired verbs have been constructed, transitions between verbs are constructed at step 135. Finally, a verb graph is constructed at step 140.

A verb M is defined by a set of motion examples $M_i$, $$M_i = \{\theta_{ij}(T), p_i, K_m : i=1 \ldots \text{Numexamples}, j=1 \ldots \text{NumDOF}, m=0 \ldots \text{NumKeyTimes}\}$$

where the $\theta_{ij}(T)$ are the j DOF functions for the $i^{th}$ motion example ($M_i$), $p_i$ is the location of the motion example in the adverb space, and K is the set of keytimes that describe the motion example's phrasing (relative timing of the structural elements). The time parameter, T, represents clock time with the clock starting at 0 at the beginning of the motion example.

Each motion example $M_i$ is defined by a number of DOF functions, denoted by $\theta_{ij}(T)$. Each $\theta_{ij}$ (i.e., the $j^{th}$ DOF for the $i^{th}$ example) is represented as a uniform cubic B-spline curve specified by a number of control points (NumCP):

$$\theta_{ij}(T) = \sum_{k=1}^{NumCP} b_{ijk} B_k(T)$$

where the $B_k(T)$ are the B-splines and the $b_{ijk}$ are the scalar B-spline coefficients or control points for the $i^{th}$ motion example $M_i$. Bartels et al., An Introduction To Splines For Use In Computer Graphics And Geometric Modeling, Morgan Kaufmann, San Francisco, 1987, describe B-splines and their properties.

Motion examples

Verbs can be constructed from sets of similar but distinct motion examples. A motion example is a curve through time for each degree of freedom of a joint. The motion examples are created or obtained at step 100 by keyframing (among other animation techniques that can be used), by an animator using any animation system, or with a motion-capture system. In either case, certain restrictions on the set of motion examples apply. One restriction is that all motion examples for a verb must be substantially structurally similar. A set of example walks, for instance, desirably all start out on the same foot, take the same number of steps, have substantially the same arm swing phase, and have virtually no spurious motions such as a head scratch. Another preferred restriction is consistent use of joint angles. Anatomically implausible settings of the DOF values can yield the same overall effect as a plausible setting due to the redundant nature of two- and three-DOF joints. Bodenheimer et al., The Process Of Motion Capture: Dealing With The Data, Computer Animation And Simulation 97, Eurographics Animation Workshop, Springer, New York, September 1997, pp. 3–18, present methods to ensure consistent DOF values for motion captured data.

At step 105, each motion example is annotated or parameterized (e.g., by hand) with a set of adverb values to place the motion example somewhere in the adverb space. In other words, each motion example $M_i$ is positioned at a point $p_i$ in the adverb space.

A library of motion capture contains a repertoire of motion examples for a variety of parameterized verbs such as walking, jogging, reaching, and idling. Some verbs, such as walk, have a large number of examples representing different emotions such as happy, sad, angry, afraid, clueless, tired, delirious, determined, frenzied, ashamed, bored, goofy, and grief stricken. Walks at different inclinations and radii of turn can also be constructed. It should be noted that the present invention does not apply characteristics of one motion example to another. Thus, "anger" from an angry walk is not applied to a run to generate an "angry" run. Instead, the present invention assumes that the initial library of motion examples contains these emotions.

Keytimes

At step 110, a set of "keytimes" (instances when important structural elements such as a foot down occur) is specified. These keytimes are used to preprocess the examples into a canonical timeline for interpolation and for later synthesis of the phrasing for the interpolated motions (time warping). In other words, the keytimes are used to line up the different motion examples to place the motion examples in phase in time. It should be noted that in the present invention, the time scaling is nonuniform and based on key events.

Figure 3:
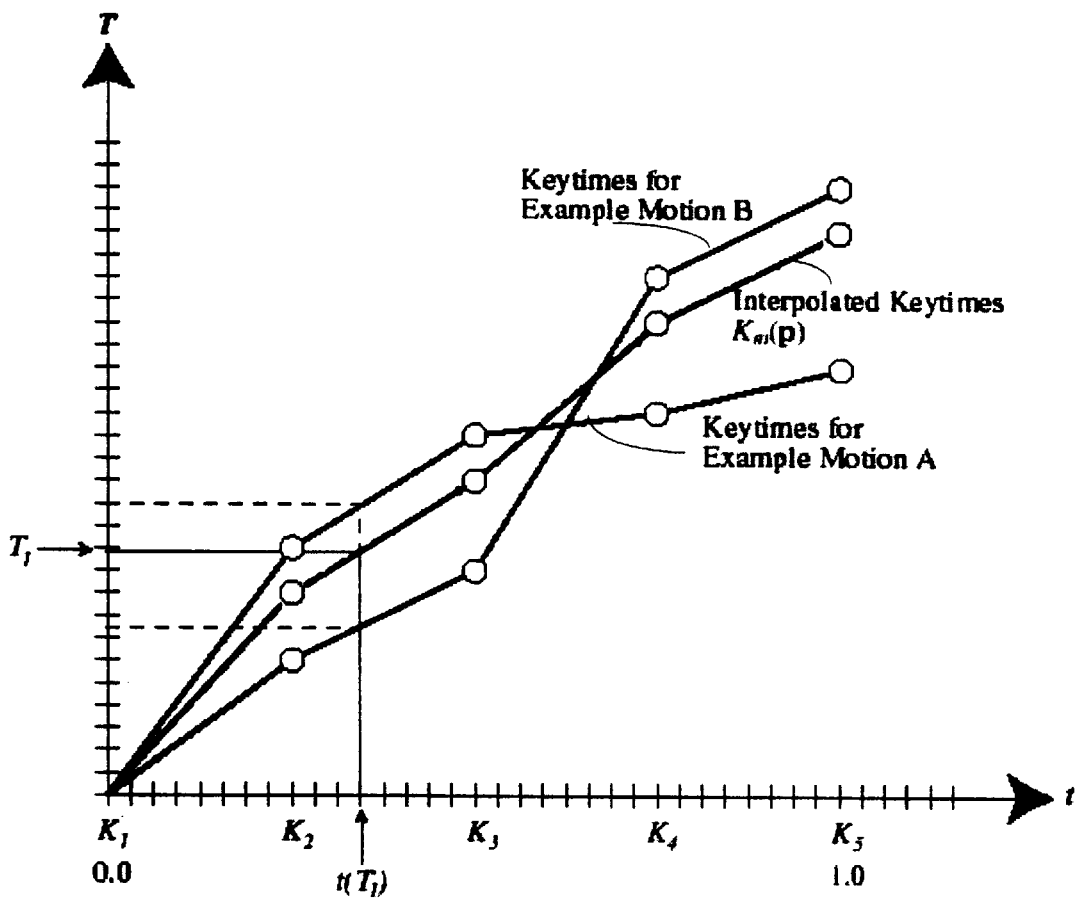
FIG. 3 shows a mapping between generic time and keytimes in accordance with the present invention.

The keytimes define a piecewise linear mapping from $T=\{0 \ldots K_{NumKeyTimes}\}$ to a generic time $t=\{0 \ldots 1\}$. Capital "T" refers to keytime time, and lower case "t" refers to canonical time. The first keytime of the verb, $K_1$, is defined as 0. The last keytime, $K_{NumKeyTimes}$, marks the verb's duration. In the case of cyclic verbs, such as walking, it desirably also marks the same event as the first. More generally, given a T between 0 and $K_{NumKeyTimes}$, $$t(T) = \left((m-1) + \frac{T - K_m}{K_{m+1} - K_m}\right) \frac{1}{NumKeyTimes - 1} \quad \text{Eqn. 1}$$

for the largest m such that $T > K_m$ and $t(0)=0$. FIG. 3 shows this mapping for motion examples A and B. Each motion example has keytimes at $K_1, K_2, \ldots, K_5$. The motion is interpolated between these keytimes in order to determine a motion example for the entire time period between $K_1$ and $K_5$. (The dashed line in FIG. 3 representing interpolated keytimes $K_m(p)$ is described below). In other words, at each keytime, the generic time $$t(K_m) = \frac{m-1}{NumKeyTimes - 1}$$

If there are four keytimes, for example, then at the third of the four keytimes, t will equal ⅔ because the keytimes will be at 0, ⅓, ⅔, and 1. Between keytimes, t is linearly interpolated for each motion example.

After all the motion examples have had their time reparameterized to canonical time t, they are in canonical form. In other words, the motion examples are scaled so that the same coefficient in each motion example represents the same moment in time. This allows for subsequent interpolation between the same moment in time on different motion examples, as described below. More specifically, for a given t, all motion examples will lie at the substantially same structural point of the motion, regardless of phrasing or overall duration. The system interpolates the motion examples within this generic timeframe. The keytime equations themselves are also interpolated between examples. The system then applies the inverse of this interpolated timing function to "untimewarp" the interpolated motion to recapture phrasing and duration.

Inverse kinematic constraints

Motion examples are then annotated at step 115 with a set of intermittent constraints (for example, the foot should not slip while in contact with the floor). In other words, in addition to time warping the motions, keytimes also specify periods during which kinematic constraints are desirably enforced. For example, a walk's keytimes might be heel-strike and toe-off Between these keytimes, the foot preferably remains stationary.

The value for specific constraint conditions, such as the location the end effector (for example, the foot) should maintain, are not set when they are designed, but are determined at playback (runtime) when a keytime is crossed that triggers a constraint, as described below.

Verb construction

After the motion examples have been specified for a verb with their associated keytimes and adverb settings, the system then constructs a continuous "space" of motions parameterized by the adverbs at step 120, using linear approximation at step 125 and radial basis functions at step 130. The linear approximation provides a best fit linear approximation. A radial basis function is associated with each motion example to account for the differences between the linear approximation and the motion example.

The dimension of the space of motions parameterized by the adverbs equals the number of adverbs, NumAdverbs. The specific values of the individual adverbs define a point in this space. The point may move from moment to moment during the interactive animation if, for example, the character's mood changes or the character begins to walk up or down hill. The goal is to produce at any point p in the adverb space a new motion M(p,t) derived by interpolating the motion examples (see interpolated keytimes line in FIG. 3). When p equals the adverb settings for a particular motion example i, then M(p,t) preferably equals $M_i(t)$.

Each motion example has one free variable for each degree of freedom's B-spline control point and one free variable for each keytime. The time warping described above ensures that corresponding control points in each motion example specify similar moments in each motion, even if the overall lengths of the motion examples differ. Thus, the motion example interpolation can be treated as a separate problem for each control point and each keytime (that is, there are NumCP×NumDOF+NumKeyTimes individual interpolation problems).

The standard problem of multivariable interpolation is: given N distinct points $p_i$ in $R^n$ and N values $v_i$ in R, find a function $f:R^n \rightarrow R$ such that for all $i, f(p_i)=v_i$ and such that $f$ does not oscillate badly between values. The high dimensionality of the space defined by the adverbs, coupled with the desire to use few motion examples (perhaps only two to three times the number of adverbs), presents difficulties for many interpolation methods. Given these difficulties, the present invention implements a combination of radial basis functions and low-order (linear) polynomials to solve this problem. The polynomial function provides an overall approximation to the space defined by the motion examples. It also allows for extrapolation outside the convex hull of the locations of the motion examples. The radial bases then locally adjust the polynomial to interpolate the motion examples themselves.

The value of each interpolated DOF curve control point in this space, $b_{jk}(p)$, is defined as $$b_{jk}(p) = \sum_{i=1}^{NumExamples} r_{ijk}R_i(p) + \sum_{l=0}^{NumAdverbs} a_{jkl}A_l(p) \quad \text{Eqn. 3}$$

where the $R_{ijk}$ and $R_i$ are the radial basis function weights and radial basis functions themselves, and the $a_{jkl}$ and $A_l$ are the linear coefficients and linear bases as described above. Interpolated keytimes are similarly defined as $$K_m(p) = \sum_{i=1}^{NumExamples} r_{im}R_i(p) + \sum_{l=0}^{NumAdverbs} a_{lm}A_l(p) \quad \text{Eqn. 4}$$

Thus, for each verb there are (NumCP×NumDOF) control point interpolations and NumKeyTimes keytime interpolations.

The specific shape of the radial coefficients is then determined by solving first for the linear coefficients and then for the radial basis coefficients.

Linear approximation

In the first step (step 125), linear coefficients are determined by finding the hyperplane through the adverb space that best fits the variation across the motion examples of the selected control point or keytime. The linear basis functions are $A_l(p)=p_l$, the $l^{th}$ component of p, and $A_0(p)=1$. An ordinary least squares solution determines the NumAdverbs+1 linear coefficients, $a_{jkl}$, that minimize the sum of squared errors between $$\tilde{b}_{ijk}(p_i) = \sum_{l=0}^{NumAdverbs} a_{jkl}A_l(p_i)$$

and $b_{ijk}$, the actual B-spline control point (or keytime) being interpolated, where $p_i$ is the adverb setting for the $i^{th}$ motion example. Letting $b_{jk}$ and $\tilde{b}_{jk}$ denote vectors of each $b_{ijk}(p_j)$ and $\tilde{b}_{ijk}(p_j)$ for a fixed j and k, the linear approximation leaves the residuals $$\bar{b}_{jk}=b_{jk}-\tilde{b}_{jk}$$

A linear combination of radial basis functions interpolates these residuals.

Radial basis functions

Radial basis functions have the form $R_i(d_i(p))$ where $R_i$ is the radial basis associated with $M_i$ and $d_i(p)$ is a measure of the distance between p and $p_i$, most often the Euclidean norm $\|p-p_i\|_2$.

Details of the mathematics for this type of interpolation are described in Micchelli, Interpolation Of Scattered Data: Distance Matrices And Conditionally Positive Definite Functions, Constructive Approximation 2, 1986, and in Powell, Radial Basis Functions For Multivariable Interpolation: A Review, Algorithms for Approximation, Oxford University Press, Oxford, UK, 1987, pp. 143–167. Radial basis functions have been used in computer graphics for image warping as described by Reprecht and Müller, Image Warping With Scattered Data Interpolation, IEEE Computer Graphics and Applications, 15, 2, March 1995, pp. 37–43, and Arad et al., Image Warping By Radial Basis Functions:

Application To Facial Expressions, Computer Vision, Graphics, and Image Processing: Graphical Models and Image Processing, 56, 2, March 1994, pp. 161–172.

The value of each interpolated DOF curve control point in this space is defined as $$\overline{b}_{jk}(p) = \sum_{i=1}^{NumExamples} r_{ijk} R_i(p)$$

where the $r_{ijk}$ and $R_i$ are the radial basis function weights and radial basis functions themselves.

The specific shape of the radial coefficients is then determined by solving first for the linear coefficients and then for the radial basis coefficients.

One radial basis function is defined for each motion example. The radial basis functions are a function of the distance, $d_i(p) = \|p - p_i\|_2$ between a point in the adverb space, p, and the point in the adverb space corresponding to motion example i, $p_i$. The radial basis itself, $R_i(p)$, has its maximum at $p_i$ (that is, where d=0). It is desirable for the radial bases to have compact support (that is, have value zero beyond some distance) to limit each motion example's influence to a local region of adverb space.

Several choices exist for the specific shape of the radial basis. For its combination of simplicity and $C^2$ continuity, a radial basis with a cross-section of a dilated cubic B-spline, $B(d/\alpha)$ is used. The dilation factor, $1/\alpha$, is used for each motion example to create a support radius for the B-spline equal to twice the Euclidean distance to the nearest other motion example. For $\alpha=1$, the cubic B-spline has a radius of 2.0, thus $\alpha$ is simply the minimum separation to the nearest other example in the adverb space. Given this definition, it is clear that the motion examples are preferably well separated.

The coefficients, $r_{ijk}$, are found for each degree of freedom B-spline control point and keytime by solving the linear system, $$Dr_{jk} = \overline{b}_{jk}$$

where $r_{jk}$ is a vector of the $r_{ijk}$ terms for a fixed j and k, and D a square matrix with terms $D_{i1,i2}$ equal to the value of the radial basis function centered on motion $i_1$ at the location of motion $i_2$. Thus, $$D_{i_1,i_2} = R_{i_1}(p_{i_2}) = B\left(\frac{d_{i_1}(p_{i_2})}{\alpha_{i_1}}\right)$$

By using radial basis functions in the interpolation scheme, the motion interpolation is efficient for use in a runtime environment rather than in the earlier construction environment. Moreover, it should be noted that the present invention decouples the solution representation from the interpolation mechanism.

As described above, both Wiley and Hahn and Guo and Roberge produce new motions using linear interpolation on a set of motion examples. Both techniques require $O(2^d)$ examples, where d is the dimensionality of the control space. Our technique, using radial B-splines, requires $O(n)$ examples to establish the baseline approximation and $O(n^3)$ to compute the resulting answer. To compare, a Delaunay triangulation of the data would require $O(n^{ceil(d/2)})$ to compute, when $d \geq 3$.

In accordance with the present invention, a designer can place new examples "between" old examples when refining the interpolated motion space. The present invention becomes refined with more examples.

The interpolation technique of the present invention decouples the interpolation scheme from the representation of the motion examples. The motion examples, therefore, could be encoded using other methods, such as a wavelet or Fourier decomposition.

Although the techniques described herein have been directed to interpolating trajectories characterized by coefficients of spline curves, the methods presented here also apply to coefficients in the Fourier and other domains. It is also contemplated to apply similar ideas to control the parameters of a physically based model.

Figure 4:
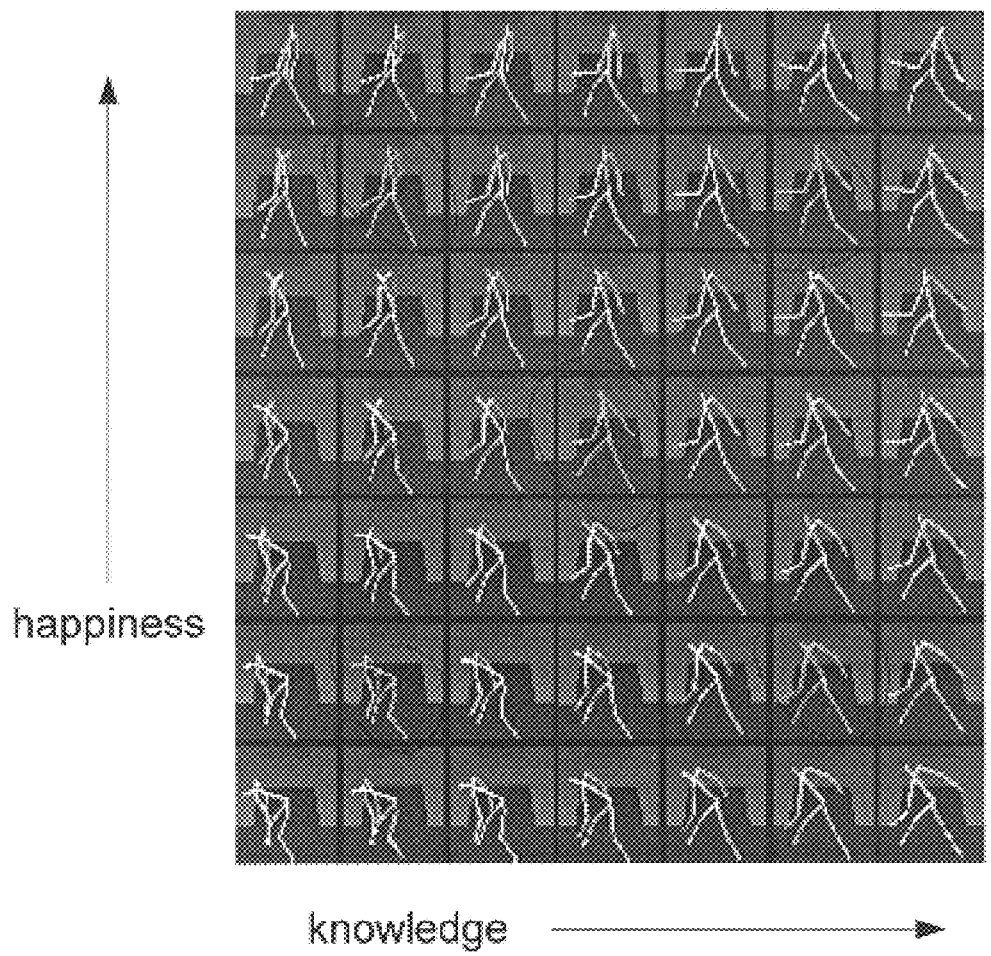
FIG. 4 shows an exemplary verb sampled across two emotional axes in accordance with the present invention.
Figure 5:
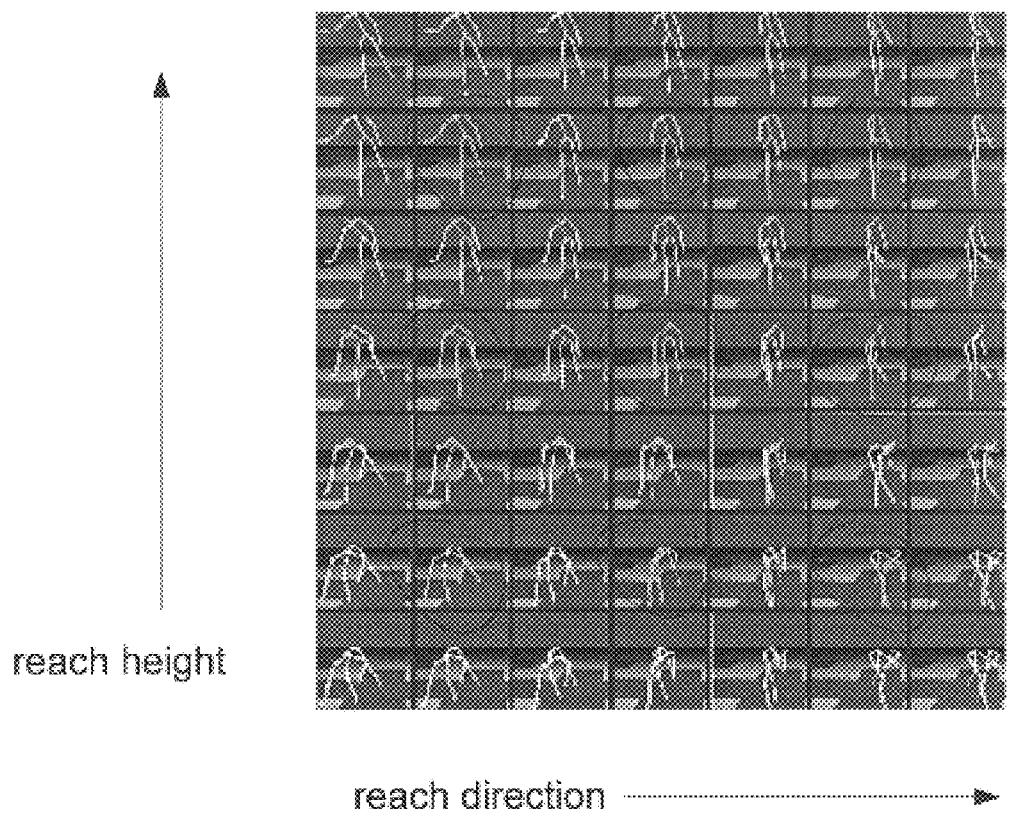
FIG. 5 shows another exemplary verb sampled across two axes in accordance with the present invention.

In accordance with the present invention, a parameterized walk has been constructed along two emotional axes: happy-sad and knowledgeable-clueless, as well as physical characteristics such as up hill or down hill and turning. FIG. 4 shows a sampling of this walk across the two emotional axes. In FIG. 4, the circled figures are the example motions and the other figures were created through the verb-adverb mechanism described below. In FIG. 4, happiness increases from bottom to top, and knowledge increases from left to right. A reaching verb was parameterized by the three positional values representing the goal of the reach (see FIG. 5). In FIG. 5, the circled figures are the example motions and the other figures were created through the verb-adverb mechanism described below. In FIG. 5, reach height ranges along the vertical axis and reach direction ranges along the horizontal direction. Various emotional idle motions have also been constructed, as well as a jog with a turning adverb.

Parameterizing a space based on turning and on changing elevation provides great control over the creature. The jogging and walking turn adverbs were constructed from two motion-captured motion examples each, a forward motion and a motion to the right. To create a third motion example to the left, the motion to the right was mirrored. The interpolation gives convincing control of the radii of the turn's curvature and allows convincing navigation.

Verb graphs

Figure 6:
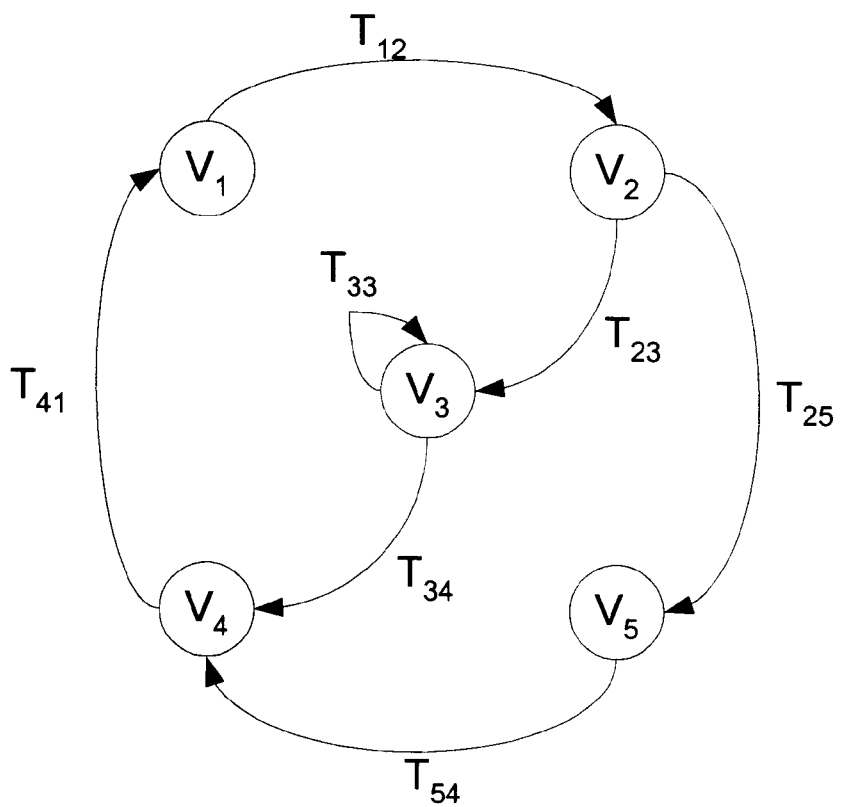
FIG. 6 shows an exemplary verb graph in accordance with the present invention.

The above steps are repeated for each verb that is desired to be constructed (e.g., walking, running, sitting). After the individual verbs have been constructed, they are combined so that smooth transitions occur between verbs. Transitions are constructed at step 135, and at step 140, an author builds a directed graph of verbs, or "verb graph," in which the nodes represent the verbs and the arcs represent transitions between verbs (see FIG. 6). A verb graph provides a structured way of representing any potential animation. In FIG. 6, for example, Verb $V_1$ could represent getting up, $V_2$ could represent running, $V_3$ could represent walking, $V_4$ could represent sitting, and $V_5$ could represent falling. The associated transitions T represent the transitions between verbs.

Transitions

Given corresponding time intervals (as set by the designer) in two verbs, transitions move control smoothly from one verb to the next. For example, in transitioning from walking to running, the time intervals may both be set to span the right foot placement.

Figure 7:
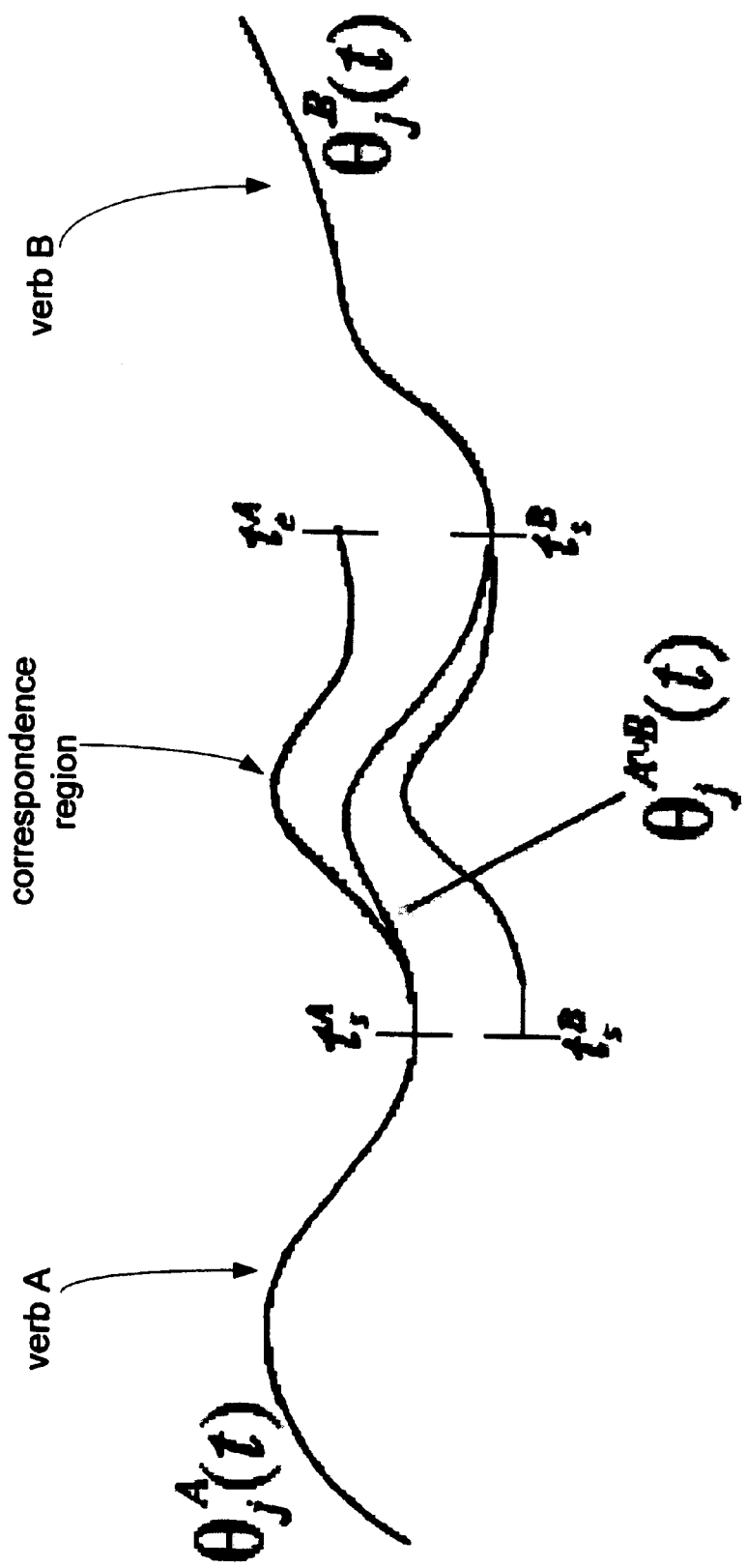
FIG. 7 shows transition blending in a correspondence region between verbs in accordance with the present invention.

A transition maps similar segments between two verbs, for example verb A and verb B. The correspondence region (see FIG. 7) is determined by the four variables, $t^A_s, t^A_e, t^B_s,$ and $t^B_e$ which represent the start and stop times of the region in each of the two verbs. Note that these times are expressed as generic times because the verbs A and B may have different duration based on their current adverb settings. In other words, the transitions are designed based on the similarity of the motions' structure (canonical time) and so will work even though the verbs themselves change at runtime.

The transition's duration is determined by taking the average of the two blending regions' lengths:

$$\frac{(T(t_e^A) - T(t_s^A)) + (T(t_e^B) - T(t_s^B))}{2}$$

where the T function maps generic time to real time (keytime time) for the verb's current adverb settings. Transitions, because they are made up of verbs, are affected by the verb's adverb settings and therefore take on the mood, duration, and phrasing of their constituent verbs.

Rose et al., Efficient Generation Of Motion Transitions Using Space-Time Constraints, Computer Graphics (Proc. Siggraph 96), August 1996, pp. 147–154, discuss space-time transitioning mechanisms. Generating space-time transitions between two motions remains an offline process. Because the specific motions the verbs generate are not known until runtime, this method is not preferred in the present invention. Thus, in the present invention, a simpler formulation is used to determine the transitions between verbs at runtime.

Verbs A and B blend together by fading one out while fading the other in. A monotonically decreasing blending function with a range and domain of [0,1] determines the relative contribution of the two verbs. A sigmoid-like function, $\alpha = 0.5 \cos(\beta\pi) + 0.5$, is used in accordance with the present invention.

Over the transition duration, $\beta$ moves linearly from 0 to 1, representing the fraction of the way through the transition intervals in each verb. The transitional motion is determined by linearly interpolating the verbs A and B with weights $\alpha$ and $1-\alpha$, respectively. The internal DOF can be determined by interpolating the joint positions as in FIG. 7, which shows the DOF function $\theta_j$ as a combination of the two DOF functions $\theta_j^A$ and $\theta_j^B$ during the transition region. The path the joint takes is defined by $\theta_j^A$ before the transition, $\theta_j^{A \rightarrow B}$ during the transition, and $\theta_j^B$ after the transition. To achieve smooth motion for the root DOF, the velocities (rather than positions) of the two verbs and interpolated and then the results are integrated over time through the transition.

If multiple transition arcs leave a verb, each transition may be given a "likelihood" that is used to stochastically choose at runtime between multiple possible transitions if none have been explicitly specified.

The adverbs are shared across verbs although each verb may or may not respond to each adverb. For example, an adverb for up hill or down hill may have no meaning to a "sit" verb. The verb graph remains static at runtime, i.e., it is fixed when authoring time is complete.

Runtime System and Method
Runtime verb evaluation

After the authored verbs are parameterized by adverbs and time warped by keytimes, and a verb graph has been constructed to organize the verbs and transitions, the structures can operate at runtime. The object is to continuously vary the adverb settings and have these changes reflected in the simulated creature's subtle motion. In other words, the user or application defines the path that the point p will take on the fly, and the runtime system preferably responds accordingly. Given the time and setting of p, the evaluation of the creature's pose is preferably fast enough to allow interactive frame rates.

Verb graph at runtime

Commands are issued to the creature to control the movement from verb to verb in the verb graph. When directed to perform a particular verb, the system executes a search to determine a sequence of transitions and verbs that will reach the desired action from the one currently playing.

The system chooses the shortest path, where shortness represents the number of needed transitions. For example, in FIG. 6, to go from $V_1$ to $V_2$ (e.g., from getting up to running), the system will select transition $T_{12}$ because this is the shortest path from $V_1$ to $V_2$. To go from $V_1$ to $V_4$ (e.g., from getting up to sitting down), the system will select either transitions $T_{12}$, $T_{25}$ and $T_{54}$ or $T_{12}$, $T_{23}$, and $T_{34}$, depending on weights which may be assigned to the transitions. A path through the verb graph is represented as a queue including transition, verb, transition, verb, and so on.

To keep the verb graph in a useful state, the root of the creature's motion is desirably stored and maintained at each time step to reorient and reposition the base verbs for concatenation onto the current action. For example, in a walk transitioning to itself (e.g., $V_3$ to $V_3$ via $T_{33}$ in FIG. 6), the horizontal position specified by the verb indicates an offset from the creature's position when the verb was invoked. Thus, the creature continues to walk forward and does not jump back to the origin on each stride. Also, the set of current active constraints is preferably updated by discarding expired constraints and creating new ones as the animation progresses.

The verb graph's execution queue cannot be empty or the creature will come to a stop. For the verb graph to continue, it transitions from its current action before that action has completed. When only the currently active verb remains in the queue, the system automatically selects a transition from the set of available transitions away from that verb. The selection is made stochastically according to weights the designer specified during the verb graph construction. In cyclic verbs such as walking, the default (with a probability of one) transition is preferably the one leading back into itself.

The adverb space and verb graph can be moved through to exhibit several degrees of emotions and subtleties of movement. Besides including parameterized verbs, a verb graph can also contain unparameterized motions such as stretching, standing, and looking around, with associated transitions between them. The transitions are generated in real time and obey inverse kinematic constraints.

Inverse kinematic constraints

As described above, the value for specific constraint conditions, such as the location the end effector (for example, the foot) should maintain, are not set when they are designed, but are determined at playback (runtime) when a keytime is crossed that triggers a constraint. If, for example, a keytime is crossed that triggers a foot constraint when the foot's horizontal location is (x,z) and the floor's height at that point is y=floor(x,z), then the constraint location is set to (x,y,z). The system maintains this constraint position until another keytime releasing the constraint is crossed.

A fast inverse kinematics optimization enforces constraints at runtime. At a given generic time t, a creature is first positioned independent of any constraints by evaluating the active verb(s) at that time. In general, this will place the end effector close to the constraint point. The DOFs between the root and the end effector may be modified when making the subtle changes needed to exactly satisfy the constraint. The changes in these DOFs needed to satisfy the constraint at each frame at runtime can be determined by solving the linear system (typically of size 5 or 6) of the form $J\Delta\theta = \Delta x$ (Eqn. 2), where J is the Jacobian of the DOF with respect to the end effector's motion, $\Delta x$ is the vector from where the verb placed the end effector to the constraint point, and $\Delta\theta$ is the amount the DOF must be perturbed to hold the end effector in place. Girard, Computational Modeling For The Computer Animation Of Legged Figures, Computer Graphics (Proc. Siggraph 85), ACM Press, New York, July 1985, pp. 263–270, and Watt, Advanced Animation And Rendering Techniques: Theory And Practice, ACM Press, New York, 1992, provide details on such inverse kinematic problems.

It is contemplated that variations in expressions and changes of behavior can be entered through user input or under the control of state machines executing under a discrete-event simulator. Thus, complex autonomous agents can be created in virtual environments.

Figure 8:
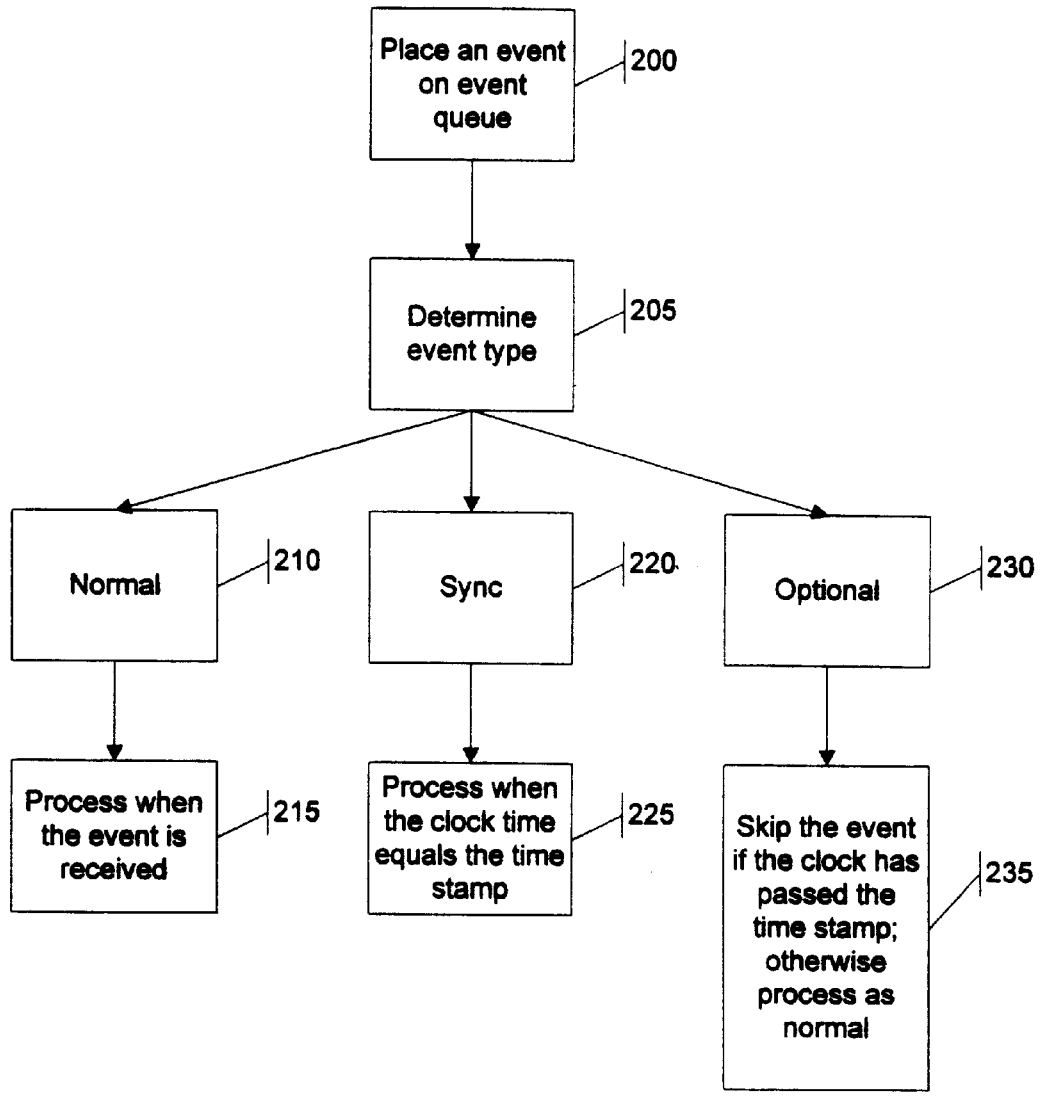
FIG. 8 is a flow diagram of an exemplary runtime method in accordance with the present invention.

An exemplary runtime method in accordance with the present invention is now described with respect to FIG. 8. An event is placed on an event queue at step 200. A discrete event simulator serves as the runtime system's main loop. The system tracks the clock and sequentially processes vents placed on the event queue. Events may be one of three types: normal, sync, or optional. Each vent has a time stamp and an associated callback function. The system inserts events in the event queue (in time stamp order) and processes them by invoking the callback function with the time stamp as a parameter.

The event type is determined at step 205. If the event is "normal", then processing continues at step 210. The system processes normal events as they are reached in the queue (step 215), independent of the relative values of the time stamp and clock. If the event is "sync", then processing continues at step 220. Sync events wait for the clock to catch up to the time stamp if the clock time is less than the time stamp (step 225); they execute immediately otherwise. If the event is "optional", then processing continues at step 230. The system skips optional events (step 235) if the clock has passed the time stamp; otherwise, optional events act like normal events.

The most common events are "render" and "display" events. A render event evaluates the DOF at the time indicated by the time stamp to set the creature's pose, then renders (but does not display) an image. The render event has the "normal" flag and thus creates an image as soon as the event reaches the queue. A display event with the same time stamp but with a sync flag waits for the clock to reach the time stamp and displays the rendered image. The render event also measures the amount of clock time between frames and estimates the best time stamp for the next render or display events and inserts them in the event queue. This way, the frame rate dynamically adjusts to the computational load.

The system schedules other events to induce transitions between verbs or to turn on or off constraints.

Evaluating DOF

Figure 9:
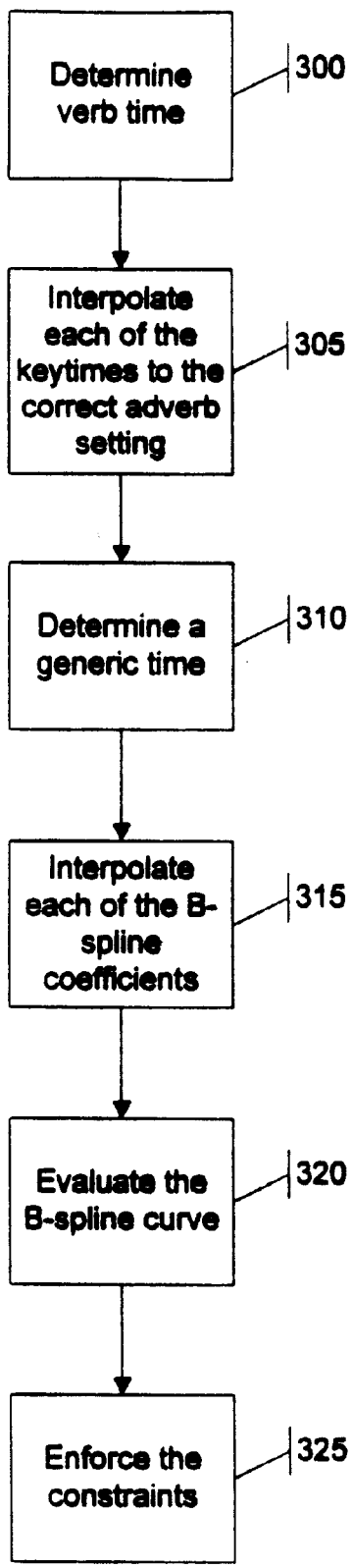
FIG. 9 is a flow diagram of an exemplary degree of freedom evaluation method in accordance with the present invention.

The render event callback requests that all DOF be evaluated at a given time, $\tau$. The currently active verb (or verbs when a transition occurs) is evaluated at time $\tau - \tau_{offset}$ with the current adverb settings, p. $\tau_{offset}$ is the clock time when the current verb or transition comes to the fore of the queue. FIG. 9, along with the following pseudocode summarizes this process:

|  | FIG. 9 |
|---|---|
| 1 T = $\tau$ - $\tau_{offset}$ | Step 300 |
| 2 | |
| 3 For each keytime m | |
| 4 $K_m$ = InterKey(m, p)  (Eqn. 4) | Step 305 |
| 5 Next | |
| 6 | |
| 7 t = GenericTime(T, K)  (Eqn. 1) | Step 310 |
| 8 | |

-continued

|  | FIG. 9 |
|---|---|
| 9 For each degree of freedom j | |
| 10 For each B-spline coefficient k | |
| 11 $b_{jk}$ = InterBSCoeff(j, k, p)  (Eqn. 3) | Step 315 |
| 12 Next | |
| 13 $\theta_i = \sum_k b_{jk} B_k(t)$ | Step 320 |
| 14 Next | |
| 15 For each kinematic constraint c | Step 325 |
| 16 EnforceConstraint(c)  (Eqn. 2) | |
| 17 Next | |

Initially, it should be noted that only lines 1, 7, 13, and 16 are evaluated at each frame time. The system caches the values computed at the other steps. At step 300, the verb time is determined to be equal to the clock time minus the time when the verb started (line 1). At step 305 (lines 3–5), each of the keytimes in interpolated to the correct adverb setting in accordance with Eqn. 4. The interpolations, lines 4 and 11, only change when the parameters change or the system invokes a new verb. At step 310 (line 7), a canonical time is determined in accordance with Eqn. 1 described above. At step 315 (line 11), interpolation is performed on the B-spline coefficients in accordance with Eqn. 3. In addition, in line 11 only four of the B-spline coefficients are used for a given t. As t progresses past a B-spline knot value, one coefficient drops off the beginning of the set of four and the system adds a new one as the knot value passes. Thus, on average, less than one of the interpolated coefficients per DOF need be evaluated per frame if p does not change. If p changes from frame to frame, four coefficients per DOF are calculated as are the m interpolated keytimes. At step 320 (line 13), the B-spline curve is evaluated. Finally, the constraints are enforced at step 325 (line 16) in accordance with Eqn. 2. The entire DOF evaluation process takes only a small fraction of the time to compute compared to the polygon rendering for the frame given the pose.

Solving for the interpolation coefficients takes about two minutes on a 200-MHz PentiumPro processor for the most complex verbs. It should be noted that this offline computation need only be carried out once per verb. At runtime, a character's position can be evaluated as described in the pseudocode above at approximately 200 Hz, or about 5 milliseconds, thus barely affecting the overall frame rate. This timing was taken with a constantly changing p, thus interpolating the full four coefficients per DOF per frame plus the m keytimes.

Conclusion

Having described and illustrated the principles of the present invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of the present invention may be applied, it should be recognized that the detailed embodiments are illustrative only and should not be taken as limiting the scope of my invention. Rather, the invention includes all such embodiments as may come within the scope and spirit of the following claims and equivalents thereto.

What is claimed is:

1. A method for authoring computer animation segments, wherein the animation segments are defined as "verbs" parameterized by "adverbs," comprising the steps of:
   providing example motion segments corresponding to a defined verb with different values of the adverb(s);
   providing the example motion segments in a system that permits a user to dynamically manipulate the value(s) of the adverb(s); and
   in response to the user's manipulation of the adverb(s), creating a new animation segment by interpolation of the example motion segments.

2. A method as recited in claim 1, wherein the defined verb comprises a set of points on an animated object, each point having a predefined number of degrees of freedom, and the value of each degree of freedom as a function of time.

3. A method as recited in claim 2, wherein each adverb has a value that is variable over a range, and the degrees of freedom of at least some of the points on the animated object are adjusted in accordance with the value of the adverb(s) at a particular point in time.

4. A method as recited in claim 3, wherein the adverb corresponds to an emotion of the animated object.

5. A method as recited in claim 3, wherein the adverb corresponds to a direction of movement of the animated object.

6. A method as recited in claim 3, wherein the adverb corresponds to a state of knowledge of the animated object.

7. A method as recited in claim 1, further comprising the step of constructing a verb graph defining allowable transitions between a plurality of verbs.

8. A method as recited in claim 1, further comprising the step of defining a set of keytimes for each example motion, wherein the keytimes correspond to predefined structural events.

9. A method as recited in claim 8, further comprising the step of using the keytimes to preprocess the example motions into a canonical and synchronized time frame.

10. A method as recited in claim 9, further comprising the step of enforcing at least one kinematic constraint during one or more of the keytimes.

11. A method as recited in claim 1, wherein the interpolation of the example segments involves the use of radial basis functions.

12. A method as recited in claim 2, wherein a root position is defined for the animated object, where the root has a predefined number of degrees of freedom representing the object's position and orientation in a global coordinate frame.

13. A method as recited in claim 12, wherein at least the root position is defined at each of a plurality of keytimes.

14. A computer readable storage medium comprising executable instructions for instructing a computer to perform the method recited in claim 1.

15. A computer animation authoring system for authoring computer animation segments, comprising:
   a plurality of example motion segments stored in a computer readable storage medium; and
   a processor, operatively coupled to the computer readable storage medium, for dynamically creating an animation segment corresponding to a verb, parameterized by an adverb, by interpolation of the example motion segments, in response to user commands manipulating the adverb, the commands received via a user input device.

16. A system according to claim 15, wherein the user input device and the processor are used to create additional animation segments, construct transitions between the animation segments, and construct a verb graph including the verbs and transitions defining allowable transitions between the verbs.

17. A system according to claim 15, wherein each of the example motion segments further comprises at least one keytime to preprocess the example motion segment into a synchronized time frame, wherein the keytime corresponds to a predefined structural event.

18. A system according to claim 15, wherein at least one of the example motion segments further comprises a kinematic constraint.

19. A system according to claim 15, wherein each example motion segment is defined by a number of degrees of freedom functions.

20. A system according to claim 19, wherein each degree of freedom function comprises a uniform cubic B-spline curve.

21. A system according to claim 15, wherein the processor uses linear approximation and radial basis functions in the interpolation for dynamically creating the animation segments.

22. A system according to claim 15, wherein the verb comprises a set of points on an animated object, each point having a predefined number of degrees of freedom, and the values of each degree of freedom as a function of time.

23. A system according to claim 22, wherein each adverb has a value that is variable over a range, and the degrees of freedom of at least some of the points on the animated object are adjusted in accordance with the value of the adverbs at a particular point in time.

24. A system according to claim 23, wherein the adverb corresponds to an emotion of the animated object.

25. A system according to claim 23, wherein the adverb corresponds to a direction of movement of the animated object.

26. A system according to claim 23, wherein the adverb corresponds to a state of knowledge of the animated object.

27. A system according to claim 22, wherein a root position is defined for the animated object, where the root has a predefined number of degrees of freedom representing the object's position and orientation in a global coordinate frame.

28. A system according to claim 27, wherein at least the root position is defined at each of a plurality of keytimes.

29. A verb graph stored on a computer readable storage medium, comprising a data structure representing a plurality of nodes and allowable transitions between and among the nodes, wherein each node represents a parameterized verb, wherein said parameterized verb is parameterized by an adverb.

30. A verb graph according to claim 29, wherein at least one of the verbs has an associated transition that leads back to the verb.

31. A runtime verb evaluation system for an object comprising computer animation segments, comprising:
   a verb graph stored on a computer readable storage medium, comprising a data structure representing a plurality of nodes and allowable transitions between and among the nodes, wherein each node represents a parameterized verb, wherein the verb is parameterized with an adverb;

a user input device for directing movement of the object between verbs in the verb graph; and a processor for determining a sequence of the verbs and transitions that will provide the desired movement, in response to user commands manipulating the adverb.

32. A system according to claim 31, further comprising an event queue for storing events corresponding to the user selected verbs, wherein the processor further determines the sequence of the verbs and transitions in response to the event queue.

33. A system according to claim 32, wherein each of the events is one of "normal", "sync", and "optional".

34. A system according to claim 33, further comprising a clock, wherein the processor processes a normal event when it reaches the queue, processes a sync event at a predetermined time, and processes an optional event when it reaches the queue unless a second predetermined time has passed.

35. A method for evaluating verbs at runtime for an object comprising computer animation segments, comprising the steps of:

providing a verb graph comprising a data structure representing a plurality of nodes and allowable transitions between and among the nodes, wherein each node represents a parameterized verb, wherein the verb is parameterized with an adverb;

providing the verb graph in a system that permits a user to dynamically direct movement of the object between verbs in the verb graph; and in response to the user's directed movement of the object by manipulation of the adverb, determining a sequence of the verbs and transitions that will provide the desired movement.

36. A method according to claim 35, further comprising the step of storing events corresponding to the user selected verbs in an event queue, and further determining the sequence of the verbs and transitions in response to the event queue.

37. A method according to claim 36, wherein each of the events is one of "normal", "sync", and "optional".

38. A method according to claim 37, further comprising the steps of processing a normal event when it reaches the queue, processing a sync event at a predetermined time, and processing an optional event when it reaches the queue unless a second predetermined time has passed.

* * * * *